United States Patent
Sauer et al.

(10) Patent No.: US 8,938,982 B2
(45) Date of Patent: Jan. 27, 2015

(54) AIR CONDITIONING SYSTEM HAVING A GAS SENSOR FOR A VEHICLE AND A METHOD FOR OPERATING AN AIR CONDITIONING SYSTEM OF THIS TYPE

(75) Inventors: Maximilian Sauer, Constance (DE); Michael Arndt, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1714 days.

(21) Appl. No.: 12/308,487

(22) PCT Filed: Jul. 23, 2007

(86) PCT No.: PCT/EP2007/057553
§ 371 (c)(1),
(2), (4) Date: Sep. 14, 2010

(87) PCT Pub. No.: WO2008/034658
PCT Pub. Date: Mar. 27, 2008

(65) Prior Publication Data
US 2011/0036106 A1    Feb. 17, 2011

(30) Foreign Application Priority Data
Sep. 20, 2006 (DE) .......................... 10 2006 044 083

(51) Int. Cl.
*B60H 1/24* (2006.01)
*B60H 1/00* (2006.01)
*B60H 3/00* (2006.01)

(52) U.S. Cl.
CPC ............ *B60H 1/00849* (2013.01); *B60H 1/008* (2013.01); *B60H 3/0085* (2013.01); *Y02T 10/88* (2013.01)
USPC .......................................................... 62/179

(58) Field of Classification Search
CPC .... B60H 3/008; B60H 1/00849; B60H 1/008; B60H 3/0085; Y02T 10/88
USPC .......................................... 62/89, 179; 454/75
See application file for complete search history.

(56) References Cited

U.S. PATENT DOCUMENTS 4,478,049 A * 10/1984 Fukui et al. ..................... 62/179
5,084,659 A    1/1992 Hayashi et al.
(Continued)

FOREIGN PATENT DOCUMENTS

CN          2098712       3/1992
DE          10316352     11/2004
(Continued)

OTHER PUBLICATIONS

International Search Report, PCT International Patent Application No. PCT/EP2007/057553, dated Nov. 26, 2007.

*Primary Examiner* — Mohammad M Ali
*Assistant Examiner* — Emmanuel Duke
(74) *Attorney, Agent, or Firm* — Kenyon & Kenyon LLP

(57) ABSTRACT

An air conditioning system for a vehicle and a method for operating the air conditioning system which at least has: an air conditioner having a fan, a recirculating air flap for setting a recirculating air operation or an external air operation, a gas sensor for measuring a gas concentration, in particular a $CO_2$ concentration in a vehicle cabin, and outputting a measuring signal, and a control unit for receiving the measuring signal of the gas sensor, for setting a recirculating air position or an external air position of the recirculating air flap and for controlling the gas sensor, the control unit switching the gas sensor into different operating modes in recirculating air operation than in external air operation.

17 Claims, 2 Drawing Sheets

(56) References Cited

U.S. PATENT DOCUMENTS

| | | | |
|---|---|---|---|
| 5,775,406 A * | 7/1998 | Ghitea, Jr. | 165/11.1 |
| 5,934,987 A * | 8/1999 | Baruschke et al. | 454/75 |
| 5,946,923 A * | 9/1999 | Samukawa et al. | 62/133 |
| 6,438,462 B1 * | 8/2002 | Hanf et al. | 700/297 |
| 6,496,009 B2 * | 12/2002 | Kataoka et al. | 324/464 |
| 2004/0250983 A1 * | 12/2004 | Arndt et al. | 165/11.1 |
| 2005/0038582 A1 * | 2/2005 | Arndt et al. | 701/29 |
| 2005/0121630 A1 * | 6/2005 | Arndt et al. | 250/504 R |
| 2005/0270536 A1 * | 12/2005 | Ludwig | 356/437 |
| 2005/0285039 A1 * | 12/2005 | Ludwig | 250/338.1 |
| 2006/0030253 A1 * | 2/2006 | Asai et al. | 454/75 |

FOREIGN PATENT DOCUMENTS

| | | | |
|---|---|---|---|
| DE | 10316352 A1 * | 11/2004 | B60H 1/00 |
| DE | 102004024284 | 2/2005 | |
| JP | 59-26318 | 2/1984 | |
| JP | 9-26214 | 1/1997 | |
| JP | 2006-1310 | 1/2006 | |

* cited by examiner

AIR CONDITIONING SYSTEM HAVING A GAS SENSOR FOR A VEHICLE AND A METHOD FOR OPERATING AN AIR CONDITIONING SYSTEM OF THIS TYPE

BACKGROUND INFORMATION

Air conditioning systems of motor vehicles generally have a recirculating air flap for adjustment between a recirculating air operation having in-vehicle circulation and an external air operation having ventilation of external air into the passenger compartment and discharge of the internal air to the outside.

Gas sensors are sometimes used in vehicles for monitoring the external air to close the recirculating flap of the air conditioning system if an elevated pollutant concentration prevails outside the vehicle.

Furthermore, gas sensors are provided for monitoring the cabin air to check the carbon dioxide content, which is influenced on the one hand by of the respiratory activity of the occupants and on the other hand also by leaks of air conditioning systems having coolants containing carbon dioxide. The carbon dioxide concentrations resulting because of the respiratory activity are lower than those from a leak.

Conventional spectroscopic measuring principles are in particular used for gas sensors, in which an infrared radiation source such as a glow coil operated in the low-current range emits infrared radiation over a measuring distance, whose absorption of infrared radiation is subsequently ascertained in an infrared detector. Furthermore, other sensor types such as chemical sensors, semiconductor gas sensors, gas FETs, and others are also conventional. In gas sensors of this type, the limited service life and the high demand on the power supply are generally problematic.

SUMMARY

According to an example embodiment of the present invention, the gas sensor may be set in different operating modes (operating states) for ascertaining the gas concentration, in particular the $CO_2$ concentration, in recirculating air operation and in external air operation.

This is based on the finding according to the present invention that harmful $CO_2$ concentrations may arise due to the respiration of the occupants only in recirculating air operation of the air conditioning system, because in external air operation, the aeration is sufficient to keep the $CO_2$ concentration adequately low.

In air conditioning systems in which no monitoring of the leakage of a coolant containing carbon dioxide is attempted, an example system is therefore suggested according to the present invention in which the sensor is ready for measurement only in recirculating air operation. If the air conditioning system is in external air operation, the gas sensor is either switched into standby operation, which lengthens its service life and saves energy, or turned off entirely.

In standby operation, the sensor only monitors its sensor interface for a wakeup signal; the further functions are turned off or—if putting it into operation would otherwise take too long—in a minimal operating mode. The infrared radiation source is preserved as the critical component in this way in spectroscopic gas sensors and its service life is thus increased. In chemical gas sensors, for example, the chemical sensor element is not heated and is thus preserved. In addition to lengthening the service life of the sensors, the power consumption is also decreased; for this purpose, the measurement electronics, for example, the microprocessor typically used in the gas sensors, is advantageously also turned off entirely or reduced to the minimal function of monitoring the sensor interface.

In air conditioning systems in which a coolant containing carbon dioxide (refrigerating fluid) is used, sudden carbon dioxide concentration increases may also occur in external air operation due to the leakage of the coolant. Therefore, a more active operating mode is provided in recirculating air operation, in which both a possible leak and also a concentration increase of carbon dioxide due to the respired air of the occupants are monitored, and a reduced operating mode at a lower resolution of the gas sensor is provided in external air operation, in which the gas sensor still outputs measuring signals, however, to detect a $CO_2$ increase due to a leak of the coolant.

The reduced operating mode at a lower resolution and thus an imprecise measuring signal may be achieved if a spectroscopic gas sensor is used in particular by supplying a lower current, i.e., less power to the particular gas sensor.

An operating mode reduced in this way having a lower resolution would not allow precise regulation and/or setting of the recirculating air flap, because the gas concentration is only ascertained roughly. However, it is recognized according to the present invention that in external air operation, a state of nearly reaching a critical limiting value of the $CO_2$ content is to be traced back to a leak of the coolant, and therefore an imprecise and/or incorrect recognition of a critical state, although the carbon dioxide value has not yet precisely reached the critical limiting value, nonetheless also justifies outputting a warning signal and/or initiating measures.

If a critical concentration value of carbon dioxide is recognized, a warning signal may be output in each case in all types of operation of the air conditioning system.

Furthermore, it may be ascertained according to the present invention from the time response of the measuring signal whether a leak of the coolant may possibly be inferred due to a rapid increase of the carbon dioxide content, because increases as a result of the respiratory activity of the occupants only result in slow changes.

The present invention may be implemented in software, solely by setting the control unit appropriately, so that it turns off the gas sensor entirely and/or emits a control signal for standby operation or low-resolution measuring operation in external air operation. The present invention may thus be implemented using relatively low alteration costs, existing air conditioning systems fundamentally being able to be retrofitted with little effort.

DETAILED DESCRIPTION OF EXAMPLE EMBODIMENTS

Figure 1:
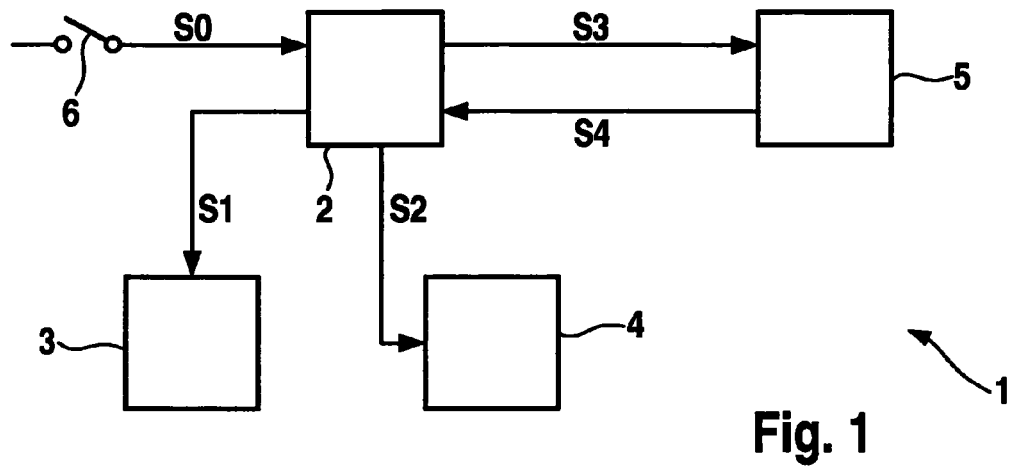
FIG. 1 shows a block diagram of an example air conditioning system according to the present invention.

According to FIG. 1, an air conditioning system 1 of a vehicle has a control unit 2, an air conditioner 3 (not described in greater detail here) having an evaporator and a fan, a recirculating air flap 4, and a $CO_2$ sensor 5. Recirculating air flap 4 is used in a conventional way for changing over between a recirculating air operation, in which the air volume contained in the passenger compartment is circulated closed off, and an external air operation, in which an exchange is performed with the ambient air.

The user specifies setting signals (operating signals) S0 to control unit 2 via a switch 6 attached in the dashboard area, for example. As a function of setting signals S0, control unit 2 switches air conditioner 3 on via first control signals S1 and sets the intensity if necessary. Furthermore, control unit 2 activates recirculating air flap 4 via second control signals S2 to set the recirculating air operation or external air operation. Recirculating air flap 4 may also be controlled automatically, i.e., without a setting signal S0 of the user, in an automatic air conditioning system 1.

Control unit 2 also activates sensor 5 via third control signals S3; particular control signals S3 are a function of the type and/or mode of operation of gas sensor 5. Gas sensor 5 may be a spectroscopic gas sensor in particular, which has an IR radiation source, e.g., a glow coil operated in the low-current range, a measuring distance having the air mixture to be studied, and a spectroscopic sensor for detecting the wavelength-dependent absorption of the IR radiation in the measuring distance. The absorption of the IR radiation in the wavelength range relevant for $CO_2$, possibly supplemented by further measuring channels for the concentration of other gas components, may be ascertained. Instead of a spectroscopic gas sensor, a chemical sensor may also be provided, for example, which has a functional layer exposed to the air mixture to be studied and having an electrical property which changes as a function of the gas composition and/or gas concentration, or a semiconductor gas sensor, a gas FET, or another gas sensor, for example. Gas sensor 5 returns corresponding measuring signals S4 having the relevant concentration values to control unit 2.

According to the present invention, gas sensor 5 may be set in various operating modes during the operation of the air conditioning system by control unit 2 via control signals S3. The type and number of the operating modes may be a function of the type and mode of operation of gas sensor 5 and air conditioner 3, in particular the coolant and/or evaporation agent of air conditioner 3. It is relevant in particular for this purpose whether a leak of a coolant containing $CO_2$ of air conditioner 3 is also to be studied; this is relevant in particular in air conditioners in which a leak of the coolant containing $CO_2$ may result in a significant increase of the $CO_2$ concentration in the inside air which is possibly harmful to health.

Furthermore, various operating modes, in particular also reduced operating modes, may be selected as a function of the particular gas sensor 5 used.

The operation of an air conditioning system 1 having an air conditioner 3 which is not to be studied for leaks is described hereafter; a coolant other than $CO_2$ may be provided in particular for this purpose. For this case, it is recognized according to the present invention that a harmful $CO_2$ concentration may only occur in recirculating air operation of air conditioning system 1, because in external air operation the aeration is sufficient to keep the $CO_2$ concentration adequately low.

Control unit 2 therefore switches gas sensor 5 into its operating mode in which the IR radiation source is completely powered if a spectroscopic gas sensor 5 is used and measuring signals S4 are continuously output to control unit 2 only in recirculating air operation, i.e., if recirculating air flap 4 is set in the recirculating air position. If measuring signal S4 indicates an elevated $CO_2$ concentration, a changeover may be made from recirculating air operation to external air operation via a corresponding control signal S2, or air conditioner 3 may be turned off if necessary via a control signal S1 and a warning signal may be output.

If recirculating air flap 4 is set to external air operation, control unit 2 switches gas sensor 5 either into standby operation, which lengthens service life and saves energy, or it turns off gas sensor 5 completely via a corresponding control signal S3.

In standby operation, gas sensor 5, which is connected via the CAN bus, for example, only monitors its sensor interface for a wakeup signal, all other functions for a spectroscopic gas sensor, in particular the powering of the IR radiation source, being turned off. For a chemical gas sensor 5, for example, the chemical sensor element is not heated and is thus preserved. The control electronics provided in gas sensor 5 may be entirely or partially turned off.

In vehicles in which gas sensor 5 is also to monitor a leak of the coolant of air conditioner 3, according to an example embodiment of the present invention, gas sensor 5 is operated both in recirculating air operation and also in external air operation and is not completely turned off. However, it is recognized according to the present invention that a lower-resolution measuring operation is possible in external air operation, because this is sufficient for detecting a leak of air conditioner 3, and in other cases no relevant $CO_2$ concentrations are to be expected. Control unit 2 therefore sets gas sensor 5 via corresponding control signals S3 in a normal, high-resolution operating mode in recirculating air operation and in a reduced operating mode in external air operation as a function of the setting of recirculating air flap 4.

In the high-resolution measuring operation, the spectroscopic gas sensor is operated using a higher power supply (voltage or current), so that the temperature of the infrared radiation source and thus the intensity in the relevant wavelength range are high.

The reduced operating mode may in particular be a low-resolution measuring operation, in which the relevant elements or components of gas sensor 5 are operated less intensively. If a spectroscopic gas sensor 5 is used, for example, a thermal infrared radiation source may be operated using a lower power supply (voltage or current), so that the temperature of the infrared radiation source and thus the intensity in the relevant wavelength range drops, but the service life of the infrared radiation source and thus of entire gas sensor 5 is significantly increased. The power consumption of gas sensor 5 also drops in this way.

Spectroscopic gas sensors typically perform a measurement of the gas concentration via a measuring channel, which transmits the wavelength ranges relevant for $CO_2$ via a suitable filter, and a reference channel, the analysis being performed by forming the difference and/or the ratio of the signals of the two measuring channels. A measurement is thus also fundamentally possible in a reduced measuring operation at lower power of the infrared radiation source, because the signal of both measuring channels is correspondingly weaker. However, there is a rougher resolution as a result of the lesser signal and thus worse signal-to-noise ratio, which does not permit measurement values as accurate as the normal, high-resolution measuring operation.

Figure 2:
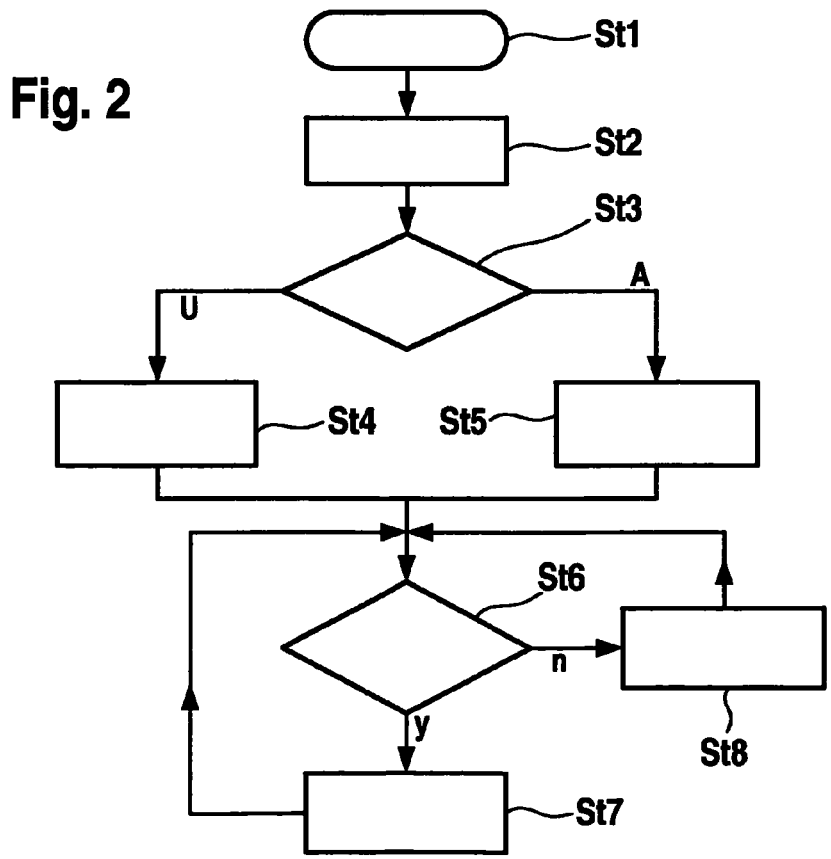
FIG. 2 shows a flow chart of the example method according to the present invention of a first specific embodiment without leak monitoring.
Figure 3:
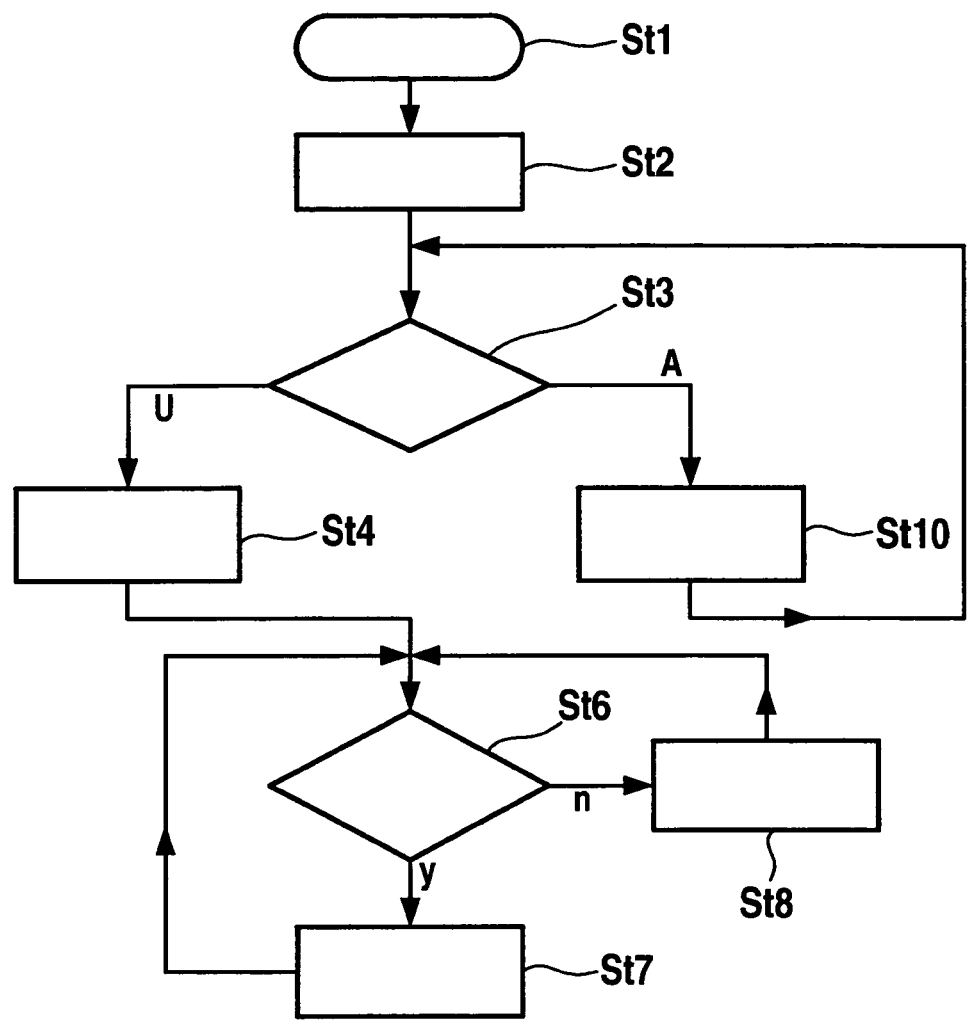
FIG. 3 shows a flow chart of an example method according to the present invention according to a further specific embodiment having leak monitoring.

The measuring methods are described further in the flow chart of FIGS. 2 and 3. In the first specific embodiment of an air conditioning system that may detect a coolant leak, the method is started in step St1, e.g., when the air conditioning system is turned on via switch 6. Control unit 2 subsequently begins operation and may always perform a complete measurement in a first step St2—independently of the setting of recirculating air flap 4—i.e., operate gas sensor 5 in the normal high-resolution operating mode to be able to preclude a high initial $CO_2$ value.

The selected recirculating air flap setting is taken into consideration subsequently in decision step St3:

In recirculating air operation, according to left branch U the normal high-resolution operating mode of gas sensor 5 is set in step St4; in external air operation, according to right branch A, the reduced, low-resolution operation of gas sensor 5 is set in step St5; in both cases, it is subsequently checked according to step St6 in each case whether a permissible $CO_2$ limiting value is maintained.

If the $CO_2$ limiting value is complied with, it is subsequently checked if necessary according to branch y in step St7 whether a change in the setting of recirculating air flap 4 or another change has been input via operating unit 6, and the method is reset before step St6 again to the check of the $CO_2$ concentration.

If it is established that the permissible $CO_2$ limiting value has been exceeded, according to branch n, various measures may be performed in subsequent step St8, for example, the external air operation may be set independently of the driver command and/or a warning signal may be output.

The method may subsequently be reset to before step St6.

FIG. 3 shows the corresponding method if an air conditioning system is used in which the leak of the coolant is not monitored. Steps St1, St2, St3, and St4, as well as St6, St7, and St8 are performed according to FIG. 2, but not St5.

If the external air operation is selected according to St3, in step St10 gas sensor 5 is switched into standby operation in which only its sensor interface is turned on, or it is turned off entirely, so that it does not output any measuring signals S4. As indicated by the loop back to before step St3, a further signal analysis may only be performed if a changeover is made to recirculating air operation and gas sensor 5 is subsequently turned on.

What is claimed is:

1. An air conditioning system for a vehicle, comprising:
an air conditioner having a fan;
a recirculating air flap to set a recirculating air operation or an external air operation;
a gas sensor to measure a CO2 gas concentration in a vehicle cabin, and to output a measuring signal; and
a control unit to receive the measuring signal of the gas sensor, to set a recirculating air position or an external air position of the recirculating air flap, and to control the gas sensor, wherein the control unit is adapted to switch the gas sensor into a different operating mode in recirculating air operation than in external air operation.

2. The air conditioning system as recited in claim 1, wherein, in the recirculating air operation, the control unit switches the gas sensor into an operating mode having higher power consumption and, in the external air operation into an operating mode having lower power consumption.

3. The air conditioning system as recited in claim 2, wherein the control unit turns off the gas sensor entirely or switches it into a standby operating mode, in which the gas sensor does not output measuring signals, in external air operation.

4. The air conditioning system as recited in claim 3, wherein the gas sensor monitors its gas sensor interface to the control unit for a wakeup signal in the standby operating state.

5. The air conditioning system as recited in claim 3, wherein the control unit does not perform any monitoring of a leak of the air conditioner.

6. The air conditioning system as recited in claim 1, wherein the control unit is adapted to set the gas sensor into an operating mode having higher resolution in recirculating air operation and into an operating mode having lower resolution in external air operation, the gas sensor adapted to emit measuring signals to the control unit in both operating modes.

7. The air conditioning system as recited in claim 6, wherein the air conditioner has a coolant containing carbon dioxide and the control unit checks whether a leak of the coolant exists from the measuring signals of the gas sensor.

8. The air conditioning system as recited in claim 6, wherein the gas sensor is a spectroscopic gas sensor having a thermal infrared radiation source, and the infrared radiation source is set at at least one of a higher temperature and a higher power supply in the operating mode having higher resolution, and is set at at least one of a lower temperature and lower power supply in the operating mode having lower resolution.

9. The air conditioning system as recited in claim 1, wherein the control unit is configured to perform the switching of the gas sensor into the different operating mode depending which of the recirculating air operation and the external air operation is current.

10. The air conditioning system as recited in claim 1, wherein the control unit is configured to perform the switching of the gas sensor into the different operating mode responsive to which of the recirculating air operation and the external air operation is current.

11. A method for operating an air conditioning system, in which either a recirculating air operation having a closed circulation of the air volume in the vehicle or an external air operation having a supply of external air is set by setting a recirculating air flap, the method comprising:
recording and analyzing measuring signals of a gas sensor analyzed to ascertain a carbon dioxide gas content; and
setting the gas sensor into a different operating mode in external air operation than in recirculating air operation.

12. The method as recited in claim 11, wherein the gas sensor is turned off entirely or set in a standby operating mode in which it does not output measuring signals, in external air operation.

13. The method as recited in claim 12, wherein the measuring signals are not checked as to whether a leak of a coolant exists.

14. The method as recited in claim 11, wherein the gas sensor is operated in a more active operating mode having higher power consumption and higher resolution in recirculating air operation and in a reduced operating mode having lower power consumption and lower resolution in external air operation, the gas sensor outputting measuring signals, which are analyzed for the carbon dioxide content in both operating modes.

15. The method as recited in claim 14, wherein a coolant containing carbon dioxide is used in an air conditioner of the air conditioning system and the measuring signals of the gas sensor are analyzed as to whether a leak of a coolant exists.

16. The method as recited in claim 11, wherein the setting of the gas sensor into the different operating mode is performed in dependence upon which of the recirculating air operation and the external air operation is current.

17. The method as recited in claim 11, wherein the setting of the gas sensor into the different operating mode is performed responsive to which of the recirculating air operation and the external air operation is current.

* * * * *